Sept. 22, 1964 R. H. TERLET 3,150,265

LIGHT SENSITIVE, MULTI-STABLE STORAGE DEVICE

Filed Aug. 30, 1961 2 Sheets-Sheet 1

INVENTOR
RENÉ H. TERLET
BY Curtis Ailes, Jr.
ATTORNEY 3,150,265

LIGHT SENSITIVE, MULTI-STABLE STORAGE DEVICE

René H. Terlet, Ossining, N.Y., assignor to International Business Machines Corporation, New York, N.Y., a corporation of New York Filed Aug. 30, 1961, Ser. No. 135,063
7 Claims. (Cl. 250—208)

This invention relates to multi-stable circuit apparatus which is particularly adapted for embodiment in switching devices such as combinations of lamps and photoconductors.

One of the recurrent problems in photoconductor switching systems is the problem of temporary storage of information and the later retrieval of that information at a desired time.

Accordingly, it is one object of the present invention to provide a multi-stable apparatus which is capable of temporary information storage and from which the information may be retrieved or read out when desired.

Another object of the present invention is the provision of apparatus which is capable of recognizing a particular sequential order of incoming signals and to operate only in response to a signal representing the next step in that order of signals.

One of the problems continually encountered in photoconductor switching is the limitation in speed of switching changes due to the slow decay in the photoconductivity as illumination is removed from the photoconductor.

Accordingly, it is another object of the present invention to provide an improved multi-stable photoconductor apparatus which relies to a maximum degree upon photoconductor rise times and to a minimum degree upon photoconductor decay times.

In carrying out the above objects of this invention in one preferred embodiment thereof, a photologic multi-state apparatus is provided which includes a circuit operable in a repeating sequence in response to successive signals on individual members of a group of input connections corresponding to steps in the sequence. The circuit includes a separate voltage responsive light source connected to each of the input connections, and each of the light sources is connected to a latching photoconductor arranged for illumination thereby. Each of the light sources also has arranged for illumination thereby individual shunt photoconductors connected in shunt with all of the other light sources except the one next to be actuated, and a plurality of the light sources have output photoconductors arranged for illumination thereby to provide intermediate signals.

There may also be provided a plurality of time-gated light sources respectively connected for operation in response to the intermediate signals, each of the time-gated light sources being connected to a latching photoconductor arranged for illumination thereby and having shunt photoconductors arranged for illumination thereby and electrically connected to disable inputs to each of said other time-gated light sources. And a plurality of output photoconductors are arranged for illumination by different ones of the time-gated light sources.

Figure 1:
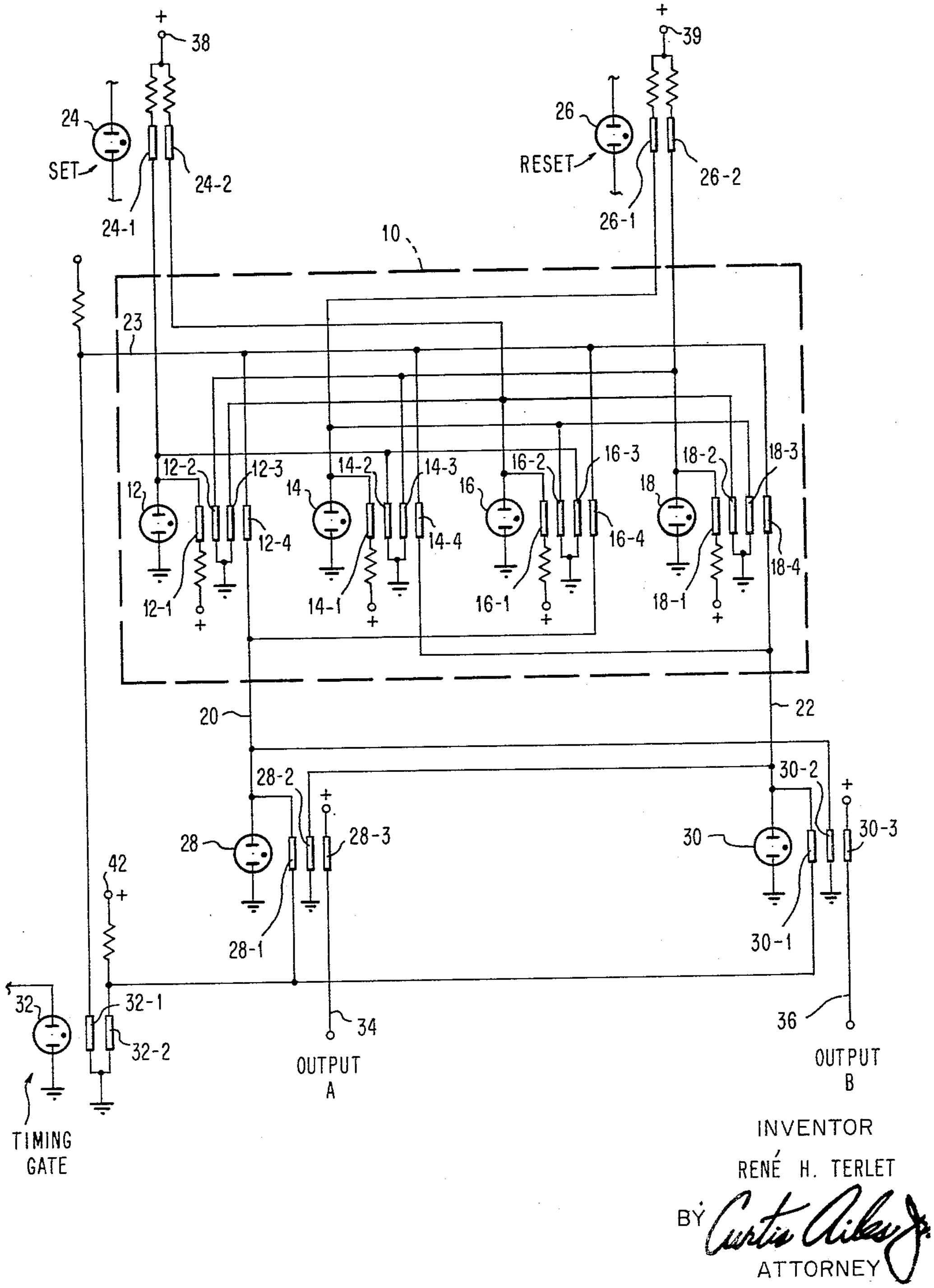
Figure 2:
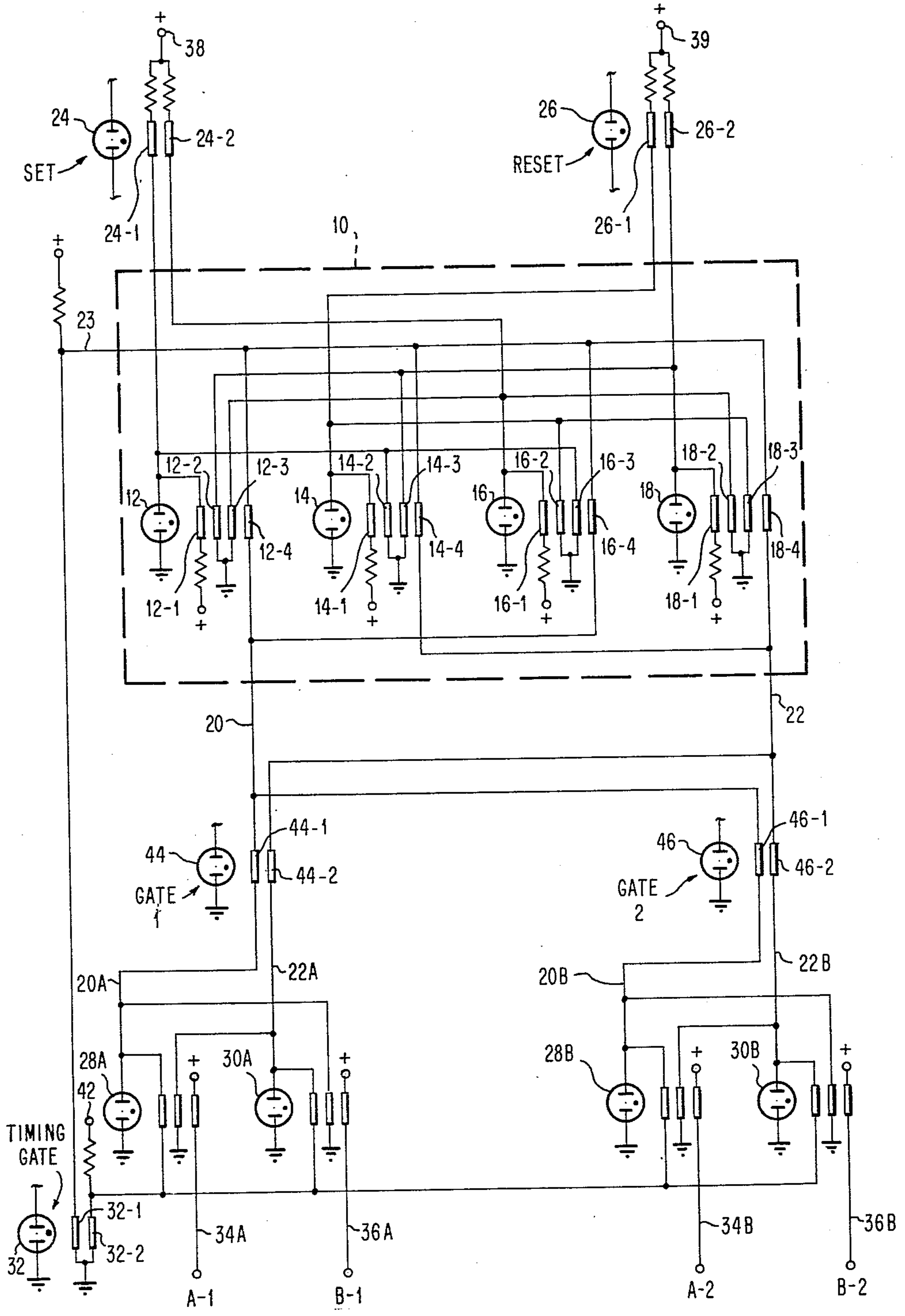

For a more complete understanding of the invention and for an appreciation of other objects and advantages thereof, attention is directed to the following specification and the accompanying drawings which are briefly described as follows:

FIG. 1 is a schematic circuit diagram illustrating a preferred embodiment of apparatus in accordance with the present invention; and FIG. 2 is a schematic circuit diagram of a modification of the apparatus of FIG. 1.

Referring particularly to FIG. 1, there is shown a sequence circuit 10 which is connected and arranged for operation as a bi-stable circuit. The circuit 10 includes voltage responsive light sources 12, 14, 16 and 18 which are connected to provide a signal either on intermediate connection 20 or on intermediate connection 22 in response to input signals provided from set and reset lamps 24 and 26. The signals on lines 20 and 22 are transmitted to control the operation of latching lamps 28 and 30 whenever a timing signal is received by a timing gate lamp 32. Outputs are provided at 34 and 36 in response to the operation of lamps 28 and 30.

The set input signals from lamp 24 are provided through the illumination of associated photoconductors 24–1 and 24–2. Photoconductors 24–1 and 24–2 are in a low resistance or conductive state when illuminated and they thus form energizing circuit paths from a source of energy indicated schematically by a power terminal 38 to the sequence circuit 10.

Throughout the drawing, the small rectangular symbols such as are used for photoconductors 24–1 and 24–2 signify devices which have photoresponsive properties which are commonly referred to as photoconductors. Since they are devices which have a lowered impedance when they are illuminated, they are more accurately described as photoresponsive impedance devices, but the popular "photoconductor" term is used in this specification. The preferred photoconductor devices will be described more fully below. Throughout the drawing the convention is followed that each photoconductor device is illuminated only by the first lamp positioned to the left of that photoconductor in the drawing. Thus, both photoconductors 24–1 and 24–2 are illuminated only by lamp 24, and they are not illuminated by lamp 26.

The reset lamp 26 provides reset signals to the circuit 10 by means of photoconductors 26–1 and 26–2 from terminal 39. The lamps within circuit 10 are arranged to operate in a repeating sequence which may commence, for instance, with lamp 12 and proceed to lamps 14, 16, and 18, and then repeat to lamp 12 again. This sequence is advanced one step at a time in response to each alternation between the set and the reset input signals. Each of the lamps 12 through 18 is provided with a latching photoconductor 12–1 through 18–1, an output photoconductor 12–4 through 18–4 and two shunt photoconductors 12–2 through 18–2 and 12–3 through 18–3. The first shunt photoconductor 12–2 through 18–2 of each set is connected in shunt, in each case, with the last preceding lamp in the sequence. Thus, photoconductor 12–2 is connected in shunt with lamp 18, photoconductor 14–2 is connected in shunt with lamp 12, photoconductor 16–2 is connected in shunt with lamp 14 and photoconductor 18–2 is connected in shunt with lamp 16. The other shunt photoconductor 12–3 through 18–3 is, in each case, connected in shunt with the second preceding (or the second succeeding) lamp in the sequence. Thus, photoconductor 12–3 is connected in shunt with lamp 16, photoconductor 14–3 is connected in shunt with lamp 18, photoconductor 16–3 is connected in shunt with lamp 12 and photoconductor 18–3 is connected in shunt with lamp 14.

If lamp 12 is assumed to be on, the shunt photoconductors 12–2 and 12–3 respectively shunt the lamps 18 and 16 so that a shift can occur in the operation of this circuit only in response to a new input signal applied to lamp 14. Such a signal may be applied through the operation of reset lamp 26 and the illumination of photoconductor 26–1. When lamp 12 is illuminated, the incidental application of a signal through photoconductor 26–2 to lamp 18 has no effect because of the presence of the shunt circuit provided by photoconductor 12–2. When lamp 14 receives a signal and becomes illuminated, the shunt photoconductor 14–2 turns off the lamp 12 and the lamp 14 latches itself on through the circuit provided by latching photoconductor 14–1. Thus the shunt circuits provided by photoconductors 12–2 and 12–3 are removed, and new shunt circuits are provided by photoconductors 14–2 and 14–3 which respectively disable lamps 12 and 18. Accordingly, a further shift can occur only in response to a new signal received by lamp 16, and this may be provided in the present system by a "set" optical signal from "set" lamp 24, and by the resultant illumination of photoconductor 24–2. In response to such a signal, lamp 16 will turn on and lamp 14 will turn off. A subsequent shift operation in response to a "reset" signal will turn on lamp 18 and turn off lamp 16, and then lamp 12 will be next to operate in response to a "set" signal etc. It is apparent from this description that the circuit including lamps 12 through 18, and associated photoconductors, is a sequence circuit which is sensitive for the purpose of a shift operation only in response to a signal which represents the next signal in a particular sequence of four signals.

With the arrangement shown in FIG. 1, with the inputs to lamps 12 and 16 both provided from set input lamp 24, and with the inputs to lamps 14 and 18 both provided from reset lamp 26, the circuit is responsive for a shift operation upon any alternation of input from "set" to "reset" or from "reset" to "set." Resultant intermediate signals are available on lines 20 and 22 by reason of the common connection of the output photoconductors 12–4 and 16–4 to supply line 20, and the common connection of output photoconductors 14–4 and 18–4 to supply line 22. These circuits are supplied from a common source by a supply bus 23.

The transfer of information signals from lines 20 and 22 to storage lamps 28 and 30 and thus to output lines 34 and 36 is controlled by the timing gate lamp 32. Lamps 28 and 30 are each provided with latching photoconductors 28–1 and 30–1 which are connected through a supply circuit 41 to a source of power indicated by the terminal 42. In addition to the output circuit photoconductors 28–3 and 30–3, each of the lamps 28 and 30 also have associated therewith shunt photoconductors 28–2 and 30–2. Photoconductor 28–2 is connected in shunt with lamp 30 and photoconductor 30–2 is connected in shunt with lamp 28. Thus, if lamp 28 is assumed to be initially on, and latched on through the circuit provided by latch photoconductor 28–1, then lamp 30 is maintained in the off condition by means of the shunt circuit provided by photoconductor 28–2, even though a signal may exist on connection 22. Under such conditions, the presence of a signal on connection 20 will obviously not change the status of the lamps 28 and 30 since lamp 28 is already illuminated. When a timing gate signal is received on lamp 32, the associated photoconductors 32–1 and 32–2 are illuminated. The illumination of 32–2 reduces the voltage on both of the latch circuits provided through supply circuit 41 and photoconductors 28–1 and 30–1 to lamps 28 and 30. This voltage reduction is such as to turn off whichever one of the lamps 28 and 30 is illuminated at the time, and when the timing gate signal is removed and the latch supply voltage is restored, either the lamp 28 or the lamp 30 is energized and illuminated depending upon whether a signal is present on line 20 or line 22. During the timing gate signal, the signals on lines 20 and 22 are suppressed because photoconductor 32–1 shunts the common supply line 23 to ground. This prevents oscillations at the lamps 28 and 30 during the timing pulse signal.

The transfer of signals from lines 20 and 22 to lamps 28 and 30 thus occurs only upon the operation of the timing gate lamp 32. Thus, if lamp 28 is assumed to be initially on and latched through latching photoconductor 28–1, and if the signal is later removed from line 20 and established on line 22, the shift from lamp 28 to lamp 30 will not occur until a timing signal is received by timing lamp 32 and subsequently removed. At the time the signal is received at lamp 32, lamp 28 will be extinguished by the reduction in latching voltage, and when latching voltages are re-established at the end of the timing pulse, lamp 30 will be illuminated by virtue of the signal on line 22. Whenever lamp 28 is on, an output is available on line 34 due to the illumination of output photoconductor 28–3. Conversely, whenever lamp 30 is on, an output is available on connection 36 by virtue of the illumination of output photoconductor 30–3.

While the circuit 10 is essentially a sequence circuit operable in a repeating sequence of four different states, it is apparent that by providing additional lamps and associated photoconductors, the length of the sequence can be increased as desired. In order to provide the strict sequential operation, however, the principle must be adhered to that each lamp has associated therewith shunt photoconductors for all of the other lamps in the set except the one to be operated next in the sequence. In the form shown in FIG. 1, it is connected to operate as a flip-flop circuit, and the circuit 10 may therefore be referred to as a flip-flop circuit in this specification.

Similarly, while the portion of the circuit including lamps 28 and 30 which is responsive to signals on lines 20 and 22 may be referred to as a gated flip-flop, or a gated bi-stable storage circuit, it is quite apparent that additional lamps could be provided in a status similar to that of lamps 28 and 30 so as to provide an arrangement which would be responsive to more than two different signals. In such an arrangement the principle must be observed that each lamp must have associated therewith a photoconductor connected in shunt with all of the other lamps in the set. A practical alternative arrangement, however, is to connect the shunt photoconductors 28–2, 30–2, et seq. in a common circuit to ground supply bus 23. An intermediate signal on lines 20 and 22 is then available only at the time one of the lamps 28 or 30 is turned on. Individual shunt circuits from each lamp to every other lamp are then not necessary and if the circuit is increased in size, only one shunt photoconductor per lamp need be provided.

The electrical characteristics of photoconductors such as are employed in the system of the present invention are such that the decay time in photoconductivity of the device after the removal of illumination therefrom is much longer than the photoconductivity rise time after illumination is first applied to the photoconductor. Many prior photoconductor logic circuits have depended upon switching functions including photoconductor decay times for operation. However, portions of the circuits of the present invention, and particularly the circuit 10 may be said to rely basically upon the fast photoconductor rise time, and to be relatively independent of the slow photoconductor decay time. For instance, when a stepwise change occurs in the operation of circuit 10, a new output is immediately available at 20 or 22 which is delayed only by the rise time of the corresponding photoconductor. Thus, for instance, if lamp 12 is on and an output is available on line 20 supplied from output photoconductor 12–4, then if a reset signal is applied through photoconductor 26–1 to lamp 14, the lamp 14 may be immediately illuminated (without any delay occasioned for the decay of photoconductivity of any photoconductor) and an output will immediately result at output connection 22 as soon as photoconductivity is apparent in photoconductor 14–4. A signal will remain for a time on output conductor 20 after the appearance of the output signal on connection 22. This is because the decay time of photoconductivity in output photoconductor 12–4 will be longer than the rise time of photoconductor 14–4. However, this overlap in output signals need not cause any inconvenience, for the utilization circuits may be designed for operation in response to immediate recognition of the presence of the new signal, and in disregard of the continuation of the old. Thus, it will be appreciated that the circuit 10 provides a sequence function or a flip-flop function which is very rapidly operable on the basis of the rapid photoconductivity rise time and which can be considered to be independent of the relatively slow photoconductor decay time.

FIG. 2 shows a modification of the embodiment of FIG. 1 in which four possible outputs are provided instead of two, and the bi-stable signals from circuit 10 are gated either through gate 1, indicated by lamp 44, or gate 2 indicated by lamp 46, and their associated photoconductors to a first gated bi-stable circuit or to a second substantially identical gated bi-stable circuit. Each of the gated bi-stable output circuits is substantially identical to that portion of FIG. 1 including lamps 28 and 30 and associated photoconductors. The first one, having outputs identified at 34A and 36A, has all components identified similarly to corresponding components in FIG. 1, but with the letter suffix "A" added thereto. The second bi-stable circuit, having outputs identified at 34B and 36B, also has all components similarly identified, but with the letter suffix "B." Circuit 10, and the input controls thereto, are substantially identical to those of FIG. 1 and are similarly lettered. The timing gate lamp 32 and associated circuitry is identical in FIG. 2 to that shown in FIG. 1 and the timing gate circuitry is arranged to serve both pairs of gated flip-flop lamps 28A and 30A, and 28B and 30B. By use of the circuit of FIG. 2 and gates 44 and 46, the output of circuit 10 may be routed to different utilization circuits upon operation of the timing gate, as desired.

The circuit of FIG. 1 may be utilized in a serial adder process unit such as that shown, for instance, in patent application Serial No. 72,489, filed by Rex Rice on November 29, 1960, for "Arithmetic Circuits," and assigned to the same assignee as the present application. In such a system the circuit of FIG. 1 may be utilized for the purpose of storing and then transmitting or reading out information on whether or not "carrys" are required. Thus, the information that the current sum is not over 9 (no carry required) may constitute the "set" signal on lamp 24, and the information that the sum is over 9 may constitute the "reset" signal on lamp 26. This information will be stored in flip-flop 10, and when the next serial addition is commenced, the information may be read out, by actuation of timing gate lamp 32. This will provide either a "no carry" signal on output line 34, or a "carry" signal on output line 36 to appropriately modify the operation of the system during the next serial addition.

If such a system is adapted for operation for subtraction by complement arithmetic, as well as for addition, then alternative treatments of the "above 9" and "not above 9" information are required. For this purpose, the modified form of the invention shown in FIG. 2 is useful. Gate 1 may be employed to signify "addition," and gate 2 may be employed to signify "subtraction." Outputs 34A and 36A will then signify respectively "no carry" and "carry" as previously described for outputs 34 and 36 of FIG. 1. When subtraction is to be performed, then output 34B will indicate a "borrow" condition and output 36B will indicate a "no borrow" condition. The above indicates only one of the many possibilities for utilization of the systems of the present invention.

As previously mentioned above, although the photoresponsive devices as illustrated in the embodiments of this invention are referred as "photoconductors" it should be emphasized that these devices, as employed in the system of the present invention, are really more accurately described as impedances which achieve a substantially reduced impedance value when they are illuminated. Thus it is contemplated that the impedance of one of these devices may be at least in the order of 200 megohms when not illuminated. But, when it is subjected to illumination its resistance may drop to a typical value in the order of 50,000 ohms and very seldom will the illuminated impedance go below a value of 10,000 ohms. Thus, it is to be seen that a device having a minimum resistance of thousands of ohms, although commonly referred to as a photoconductor, should be more accurately described as an impedance having photoresponsive properties. However, the term "photoconductor" and the like is used in this specification, keeping these qualifications in mind. In the description of the circuits, for convenience, circuit paths are often described as "completed" by the illumination of a particular photoconductor. It will be understood that this is not strictly correct because such a statement really means that a circuit path of lowered impedance is created by illumination of a photoconductor in a circuit which already exists.

Photoconductive devices having impedance characteristics as described above are commercially available. For instance, one such device may be purchased from the Clairex Corporation, of 50 West 26th Street, in New York City, under model number CL3A.

The typical impedance of the photoconductor as indicated above, at 50,000 ohms when illuminated, is applicable when the illumination is from a neon glow lamp positioned within reasonable proximity to the photoconductor. Small, inexpensive neon glow lamps which are suitable for this purpose are commonly available. A typical device of this kind is available for instance from the General Electric Company under Model No. NE-2. Such a device may require about 70 volts to initiate glow conduction when new, but after appreciable aging has occurred, the firing voltage may advance to the order of 115 volts. After the lamp has become illuminated, a negative resistance effect is to be observed such that the voltage across the glow lamp may drop to about 55 volts. As the lamp ages, this voltage also rises to a maximum value in the order of 100 volts. The current required for such a neon lamp may vary from one quarter of a milliampere to one milliampere.

It will be appreciated that various other voltage responsive light source devices may be employed and that other photoresponsive devices may be used to detect the illumination from such devices. For instance, the voltage responsive light sources may be electroluminescent devices, or incandescent filament devices, or devices employing gaseous discharges to derive illumination from fluorescent coatings. In each instance, photoconductive devices are selected which are particularly responsive to the spectrum of light emitted by the light source employed. Fortunately, the neon lamps mentioned above and the photoconductive devices mentioned above work well together. Accordingly, the neons are preferred and the light sources in the present specification are all indicated as being neon light sources, but it will be understood that other sources may be employed if desired.

One important advantage of the neon glow lamp as an electrical voltage responsive light source in the present system is the fact that it remains substantially completely dark until its firing voltage threshold is achieved, at which time it suddenly provides substantially full output illumination with a reduced voltage requirement. This characteristic is very desirable because it prevents false operation as long as the voltage is below the threshold value. It also provides for positive operation whenever the voltage goes above the threshold.

With neon glow lamps, it is generally necessary that some series impedance be employed, as well as some shunt impedance. The value of each of the shunt impedances is preferably about one megohm. This one megohm shunt across each neon serves to set a maximum impedance for the neon with respect to the remainder of the circuit. Although impedance values for the various circuit components are not specified, it will be understood that whenever operation is required to provide output illumination, the series impedances for the various neons generally will be so chosen as to result in a neon current in the order of one milliampere.

In order to simplify the drawings and make them clearer and more easily understood some of the lamp shunt impedances are omitted from the drawings, but it will be understood that such impedances are to be employed in the practical embodiments of the invention. Also, to further simplify the drawings, the power supply connections are not wired in, either at the common ground connection or at the high voltage connections. The common ground connections are indicated conventionally by the ground symbol, and the high voltage connections are indicated by a terminal symbol with a + sign. The value of the supply voltage may be selected to conform to the impedance values and the current requirements of the circuit design. A good workable value of supply voltage has been found to be about 300 volts. When employing neon lamps as the light sources, it has been found desirable to employ a direct current power supply source, or an alternating current power supply at a frequency of about 1000 cycles. With other light sources, other voltages and frequencies may be employed. Conventional sources of power may be employed to obtain satisfactory operation of the systems of the present invention.

While the invention has been particularly shown and described with reference to preferred embodiments thereof, it will be understood by those skilled in the art that various changes in form and details be made therein without departing from the spirit and scope of the invention.

What is claimed is:

1. A photologic circuit operable in a repeating sequence in a stepwise manner in response to each signal occurring in the required sequence on a plurality of input connections comprising a separate voltage responsive light source connected to each of said input connections, each of said light sources having a latching photoconductor arranged for illumination thereby and connected to a source of latching power, and each of said light sources also having arranged for illumination thereby individual shunt photoconductors electrically connected in shunt with all of the others of said light sources except the light source next to be actuated in the sequence.

2. A photologic flip-flop circuit which is responsive to separate inputs on set and reset input lines comprising four voltage responsive light sources connected and arranged for progressive repeating operation in sequence with each step of advancement in the sequence being made in response to each alternation by the set and reset inputs, the first and third of said light sources being connected for response to said set inputs and the second and fourth of said light sources being connected for response to said reset inputs, each of said light sources being provided with a latching photoconductor arranged for illumination thereby and connected to provide a continuing source of voltage thereto when once illuminated, each of said light sources having first and second shunt photoconductors associated therewith and arranged to receive illumination therefrom, said first shunt photoconductor being connected in shunt with the last preceding light source in said sequence, and the second of said shunt photoconductors being connected in shunt with the second succeeding light source in said sequence, each of said light sources having an output photoconductor associated therewith, said output photoconductors of said first and third light sources being connected together to form a first common output and said output conductors of said second and fourth light sources being connected together to form a second common output, and bi-stable apparatus connected to receive said outputs.

3. Bi-stable apparatus comprising a flip-flop circuit and apparatus connected to receive the outputs from said flip-flop circuit comprising a separate voltage responsive light source connected for illumination in response to each of said outputs, each of said light sources having a shunt photoconductor arranged to receive illumination therefrom and connected in shunt wtih the other light source for disablement thereof, each of said light sources having associated therewith a latching photoconductor arranged for illumination thereby and connected to a power source for latching the light source in the illuminated condition, and a timing gate device including a voltage responsive light source operable in response to a timing gate signal and including at least one photoconductor arranged to receive illumination from said timing gate light source and connected to simultaneously control said latch photoconductor circuits.

4. A photologic multi-state apparatus comprising a circuit operable in a repeating sequence in response to signals occurring in a required sequence on individual members of a group of input connections, comprising a separate voltage responsive light source connected to each of said input connections, each of said light sources being connected to a latching photoconductor arranged for illumination thereby and each of said light sources also having arranged for illumination thereby individual shunt photoconductors connected in shunt with all of the other light sources except the one next to be actuated, a plurality of said light sources having output photoconductors arranged for illumination thereby to provide intermediate signals, a plurality of time-gated light sources respectively connected for operation in response to said intermediate signals, each of said time-gated light sources being connected to a latching photoconductor arranged for illumination thereby and shunt photoconductors arranged for illumination thereby and electrically connected to disable inputs to each of said other time-gated light sources, and a plurality of output photoconductors arranged for illumination by different ones of said time-gated light sources.

5. A photologic multi-state apparatus comprising a circuit operable in a repeating sequence in a stepwise manner in response to each signal occurring in the required sequence on a plurality of input connections comprising a separate voltage responsive light source connected to each of said input connections, each of said light sources having a latching photoconductor arranged for illumination thereby and connected to a source of latching power and each of said light sources also having arranged for illumination thereby individual shunt photoconductors electrically connected in shunt with all of the others of said light sources except the light source next to be actuated in the sequence, a plurality of said light sources having output photoconductors arranged for illumination thereby to provide intermediate signals, a plurality of time-gated light sources respectively connected for operation in response to said intermediate signals, said time-gated light sources each including latching photoconductors arranged for illumination thereby and connected to provide latching power thereto and shunt photoconductors arranged for illumination thereby and electrically connected to disable inputs to each of said other time-gated light sources, and a plurality of output photoconductors arranged for illumination by different ones of said time-gated light sources.

6. A photologic two-state apparatus comprising a circuit operable in a repeating sequence in response to signals occurring in an alternating sequence between two groups of input connections, comprising a separate voltage responsive light source connected to each of said input connections, each of said light sources being connected to a latching photoconductor arranged for illumination thereby and each of said light sources also having arranged for illumination thereby individual shunt photoconductors connected in shunt with all of the other light sources except the one in the other group next to be actuated, each of said light sources having an output photoconductor arranged for illumination thereby to provide an intermediate signal, said output photoconductors of the light sources of each group being connected to provide said intermediate signals on a common connection, two time-gated light sources respectively connected for operation in response to said intermediate signal on said common connections, each of said time-gated light sources being connected to a latching photoconductor arranged for illumination thereby and shunt photoconductors arranged for illumination thereby and electrically connected to disable inputs to said other time-gated light source, and output photoconductors respectively arranged for illumination by each of said time-gated light sources.

7. Bi-stable apparatus comprising a photologic flip-flop circuit which is responsive to separate inputs on set and reset input lines comprising four voltage responsive light sources connected and arranged for progressive repeating operation in sequence with each step of advancement in the sequence being made in response to each alternation by the set and reset inputs, the first and third of said light sources being connected for response to said set inputs and the second and fourth of said light sources being connected for response to said reset inputs, each of said light sources being provided with a latching photoconductor arranged for illumination thereby and connected to provide a continuing source of voltage thereto when once illuminated, each of said light sources having first and second shunt photoconductors associated therewith and arranged to receive illumination therefrom, said first shunt photoconductor being connected in shunt with the last preceding light source in said sequence, and the second of said shunt photoconductors being connected in shunt with the second succeeding light source in said sequence, each of said light sources having an output photoconductor associated therewith, said output photoconductors of said first and third light sources being connected together to form a first common output and said output conductors of said second and fourth light sources being connected together to form a second common output, and apparatus connected to receive the outputs from said flip-flop circuit comprising a separate voltage responsive light source connected for illumination in response to each of said outputs, each of said light sources having a shunt photoconductor arranged to receive illumination therefrom and connected in shunt with the other light source for disablement thereof, each of said light sources having associated therewith a latching photoconductor arranged for illumination thereby and connected to a power source for latching the light source in the illuminated condition, and a timing gate device including a voltage responsive light source operable in response to a timing gate signal and including at least one photoconductor arranged to receive illumination from said timing gate light source and connected to control said latch photoconductor circuits.

References Cited in the file of this patent

UNITED STATES PATENTS

| | | |
|---|---|---|
| 2,885,564 | Marshall | May 5, 1959 |
| 2,949,538 | Tomlinson | Aug. 16, 1960 |
| 2,985,763 | Ress | May 23, 1961 |
| 3,020,410 | Bowerman | Feb. 6, 1962 |
| 3,038,080 | Matarese | June 5, 1962 |

OTHER REFERENCES

Standeven: Opto-Electronics Ring Counter, IBM Technical Disclosure Bulletin, vol. 2, No. 2, August 1959, pp. 64 and 65.

Haining: Triggerable Flip-Flop Circuit With Electroluminescent and Photoconductive Elements, RCA Technical Notes, No. 390, June 1960.